(12) United States Patent
An et al.

(10) Patent No.: US 8,738,388 B1
(45) Date of Patent: May 27, 2014

(54) MARKET BASED DATA CLEANING

(75) Inventors: Mark Y. An, North Potomac, MD (US); Andre H. Gao, Columbia, MD (US)

(73) Assignee: Fannie Mae, Washington, DC (US)

( * ) Notice: Subject to any disclaimer, the term of this patent is extended or adjusted under 35 U.S.C. 154(b) by 2484 days.

(21) Appl. No.: 11/033,955

(22) Filed: Jan. 12, 2005

(51) Int. Cl.
*G06Q 10/00* (2012.01)

(52) U.S. Cl.
USPC ............................ 705/1.1; 705/7.29; 705/306

(58) Field of Classification Search
CPC ....... G06Q 10/00; G06Q 10/06; G06Q 30/02; G06Q 30/0201; G06Q 30/06; G06Q 50/00
USPC .................................... 705/1.1, 80, 7.29, 306
See application file for complete search history.

(56) References Cited

U.S. PATENT DOCUMENTS

| | | | |
|---|---|---|---|
| 5,361,201 A | 11/1994 | Jost et al. | |
| 5,893,069 A | 4/1999 | White, Jr. | |
| 6,401,070 B1 * | 6/2002 | McManus et al. | 705/313 |
| 6,510,419 B1 | 1/2003 | Gatto | |
| 6,609,109 B1 | 8/2003 | Bradley et al. | |
| 6,609,118 B1 | 8/2003 | Khedkar et al. | |
| 6,681,211 B1 | 1/2004 | Gatto | |
| 6,842,738 B1 | 1/2005 | Bradley et al. | |
| 6,876,955 B1 | 4/2005 | Fleming et al. | |
| 7,418,408 B1 * | 8/2008 | Heppe | 705/26.3 |
| 2002/0059126 A1 | 5/2002 | Ricciardi | |
| 2003/0046199 A1 | 3/2003 | Murase et al. | |
| 2003/0046280 A1 * | 3/2003 | Rotter et al. | 707/6 |
| 2003/0078878 A1 | 4/2003 | Opsahl-Ong | |
| 2003/0191723 A1 * | 10/2003 | Foretich et al. | 705/400 |
| 2004/0010443 A1 | 1/2004 | May et al. | |
| 2010/0145773 A1 * | 6/2010 | Desai et al. | 705/10 |

OTHER PUBLICATIONS

Archer, W.R. et al., "Measuring the Importance of Location in House Price Appreciation", *J. of Urban Economics*, vol. 40, 1996, pp. 334-353.
Case, K.E. & Shiller, R.J., "Forecasting Prices and Excess Returns in the Housing Market", *J. of the AREUEA*, 1990, 18(3), pp. 253-273.
Abraham et al., "New Evidence on Home Prices from Freddie Mac Repeat Sales". Journal of the American Real Estate & Urban Economics Association, Fall 1991, vol. 19, Issue 3, pp. 333-352.
Raftery, A. et al., "Model Selection and Accounting for Model Uncertainty in Linear Regression Models", Nov. 19, 1993, U of Washington, pp. 1-24.
Vandell, K.D., "Optimal Comparable Selection and Weighting in Real Property Valuation", AREUEA Journal, vol. 19(2), 1991, pp. 213-239.

(Continued)

*Primary Examiner* — Scott A Mattia
(74) *Attorney, Agent, or Firm* — Rader, Fishman & Grauer PLLC

(57) ABSTRACT

Market based data cleaning for mitigation of idiosyncratic errors in transaction data used for property valuation. The market based data cleaning technique helps to ensure that the most accurate record is retained for a transaction when duplicate records are found, by ensuring that the retained record is the most consistent with other transactions of the same property, the local market trend, and neighborhood market. Algorithms accommodate the adoption of a value as a representative single record for a transaction where multiple records are present for a transaction. Following duplicate removal, market based data cleaning further eliminates erroneous records by eliminating transaction outliers, also preferably based upon the local market trend, along with all of the remaining transactions for each given property.

20 Claims, 11 Drawing Sheets

(56) References Cited

OTHER PUBLICATIONS

Stephens, W. et al. "Conventional Mortgage Home Price Index", J. of Housing Research, vol. 6(3),pp. 389-418.

Case, K.E. & Shiller, R.J., "The Efficiency of the Market for Single-Family Homes", The American Economic Review, vol. 79(1), Mar. 1989,pp. 125-137.

Pace, R.K. & Gilley, O.W., "Appraisal Across Jurisdictions Using Bayesian Estatemation with Bootstrapped Priors for Secondary Mortgage Market Applications", *Prop Tax J*, Mar. 1989, 8 (1), pp. 27-42.

Gearge W. Gau et al., "Optimal Comparable Selection and Weighting in Real Property Valuation: An Extension" (Journal of the American Real Estate and Urban Economics Association 1992, V20, 1: pp. 107-123.

Sessions, D.N. & Chatterjee, S., "The Combining of Forecasts Using Recrursive Tecniques With Non-Stationary Weights", *J. of Forecasts*, 1989, 8(3), pp. 239-251.

Case, K.E. & Shiller, R.J., "Prices of Single-Family Homes Since 1970:New Indexes for Four Cities", New England Economic Review, Sep./Oct. 1987, pp. 45-46.

Case, B. & Quigley, J.M., "The Dynamics of Real Estate Prices", *Rev. of Econ. & Stats*., Feb. 1991, 73(1), pp. 50-58.

Quigley, J.M., "A Simple Hybrid Model for Estimating Real Estate Price Indexes", *J. Houseing Econ*., Mar. 1995,4 (1), pp. 1-12.

Steven Wood "Combining Forecasts to Predict Property Values for Single-Family Residences" Land Economics, May 1976, pp. 221-229.

Case et al., "On Choosing Among House Price Index Methodologies", Journal of the American Real Estate & Urban Economics Association, vol. 19, No. 3,1991, pp. 286-307.

Andrews, R.L.& Ferguson,J.T., "Integrating Judgement with Regression Appraisal",*Real Estate Appraiser and Analyst*, Spring 1986, pp. 71-74.

\* cited by examiner

MARKET BASED DATA CLEANING

CROSS REFERENCE TO RELATED APPLICATIONS

This application is related to U.S. Pat. No. 7,765,125 entitled "Trunk Branch Repeat Transaction Index for Property Valuation" and issued on Jul. 27, 2010, and U.S. Pat. No. 7,831,492 entitled "Multiple Transaction Property Valuation" and issued on Nov. 9, 2010, by the same inventors named herein. The entire contents of these applications are hereby incorporated by reference.

BACKGROUND OF THE INVENTION

1. Field of the Invention

This invention relates generally to property valuation and more particularly to processing transaction data in conjunction with the estimation and application of house price indices (HPI) in marking-to-market predictions.

2. Description of the Related Art

A house price index (HPI) measures the average price appreciation of residential properties in a properly defined housing market. Once it is estimated, the HPI for a market can be used to predict the value of any property located in that market, provided the property had a prior transaction. The predicted value is derived using a previous transaction for that property and the overall market appreciation implied by the market HPI. This value prediction via the estimation and the application of HPI may be called marking-to-market (MTM).

The repeated transaction index (RTI) model is a commonly recognized method for estimating HPIs. This method was proposed by Bailey et al. (1963) and popularized by the seminal work of Case and Schiller (1989) ("Case-Shiller"). The RTI model, which may also be referred to as a repeat sales model, regresses the log difference between the two transacted values of a same address on time dummies. The estimated parameters of the RTI model represent a house price index that may be a piecewise constant function of time, wherein each basic time interval (usually a calendar quarter) is deemed to have the same house price level. The RTI model may also be variously modified. For example, one might want to consider the HPI as a non-parametric and continuous function of time.

Transaction values recorded in data are often observed with errors. The errors can be classified into idiosyncratic error and systematic bias. The former results from poor data integrity. It manifests itself at the transaction level but tends to cancel out at a reasonable aggregate/cohort level. The latter is often a result of misspecification of the model or some misuse of data, and tends to remain present at the aggregate/cohort level.

Previous literature has recognized many sources of systematic bias and has proposed various ways of correcting those biases. One source of such systematic bias can be termed as aggregation bias. Because of the lack of sufficient transaction data for each local housing market, it becomes a necessity to define a very large area as one single housing market. A large geographic area may include numerous heterogeneous local neighborhoods that may differ greatly in housing price dynamics. Forcing all these neighborhoods to share the same HPI creates an aggregation bias.

One way to circumvent the aggregation bias is to seek other data sources so that one can estimate separate HPIs for smaller and more homogeneous markets. To this end, some home price estimation uses data on mortgage transactions as well as on publicly recorded deed transactions, because associated with each mortgage loan transaction there is typically a valuation of the underlying collateral. Mortgage transactions can be classified into loans for purchases and loans for refinances. Using data on refinance transactions creates another source of systematic bias embedded in different transaction types.

The best property transaction data are believed to be records of arm's length purchase transactions, wherein the transaction price reflects the results of negotiation between a buyer and a seller. It has been recognized that different loan types or segments imply different degrees of valuation bias. It is believed that valuation bias is a function of loan purpose, loan-to-value ratio, and other factors. This is referred to as transaction type bias.

Accounting for transaction type bias is well known, such as described by Stephens et al. (1995) and Chinloy et al. (1996). Existing models account for this bias but remain inadequate. One model proposes a solution of the appraisal bias specific to the refinance data. This solution purports to generally enhance the repeat sales model by taking into account this bias. However, this approach is inadequate because, among other things, it does not accommodate for different data requirements that may be needed at different levels of geographic aggregation.

The use of both purchase transaction data and mortgage refinance data in the estimation of HPI is advocated in the Office of Federal Housing Enterprise Oversight (OFHEO)'s HPI. OFHEO, a regulatory body for Government Sponsored Entities (GSE), estimates RTI based HPIs for various housing markets by collecting loan acquisition data from the two housing GSEs. The OFHEO approach implements large data stores to increase coverage and support drilling down to smaller and more homogenous housing markets. Two significant limitations to this approach are that the transaction type bias in refinance transactions may render the estimated HPI biased, and that the fluctuation in the share of refinance transactions (e.g., from mortgage interest rate swings) causes the HPI to be dominated by purchase transactions in some periods, and refinance transactions in other periods, resulting in unwanted volatility.

Another problem with estimation that involves transaction data is idiosyncratic error. Even for a purchase transaction, the recorded transaction value in the data does not always reflect the true market value for the underlying property at a given point of time. The source of this idiosyncratic error stems from (1) recording error (e.g., missing a decimal point, a mismatch for the address name or the unit number, etc.); (2) market inefficiency; and (3) outright fraudulent transaction. Additionally, duplicate records may exist for various resources. For example one typically obtains property transaction data from several sources, which may each provide a record for a given transaction.

Another problem with property valuation relates to marking-to-market, namely, how to use prior transactions and estimated HPIs to predict current property values. Conventionally, one marks-to-market a property value by using a prior sale value and the estimated local HPI to derive the current value for a given property. If there is more than one prior transaction for the same property, one has to decide which prior transaction to use for predicting the current price of the property. There are different thoughts as to which prior transaction to choose. Being mindful of the embedded transaction type bias, one school of thought advocates using only prior purchase transactions to mark-to-market. This approach sacrifices in coverage, as there are properties whose only prior transactions are non-purchase transactions. However, if there are non-purchase transactions that are significantly more recent than the purchase transaction, a practitioner might prefer to use the non-purchase transaction. Each existing practice thus has significant drawbacks.

What is needed are repeated transaction based property valuation techniques that better accommodate for systematic and idiosyncratic error, and techniques that accommodate better estimations in marking-to-market for a given property with multiple prior transactions.

SUMMARY OF THE INVENTION

The present invention provides various different aspects that may be independently practiced, or practiced together, such as components in a property valuation system.

According to one aspect, the present invention provides an RTI for HPI estimation that controls for systematic bias. This may be referred to as Trunk-Branch RTI (TB-RTI). TB-RTI particularly controls both aggregation bias and transaction type bias. It initially uses trusted (e.g., purchase) transaction records for HPI estimation for large areas where transaction data are deemed sufficient to support viable HPI estimation. It then removes the bias from individual records, particularly but not necessarily limited to questioned (e.g., non-purchase) transaction records. Finally, it then uses all available data for HPI estimation for smaller areas (e.g., zip codes, neighborhoods, etc.) once the biases in the data are corrected.

According to another aspect, the present invention provides data cleaning that mitigates idiosyncratic errors. With regard to duplication, data cleaning according to this aspect helps to ensure that the most accurate record is retained for a transaction. This is preferably accommodated by ensuring that the retained record is the most consistent with other transactions of the same property, the local market trend, and neighborhood market. Additionally, algorithms accommodate the adoption of a value as a representative single record for a transaction where multiple records are present for a transaction. Following duplicate removal, data cleaning further eliminates erroneous records by eliminating transaction outliers. This is preferably also based upon the local market trend, along with all of the remaining transactions for each given property.

According to still another aspect, the present invention provides property valuation that uses multiple transactions in predicting a value for a property. This may be referred to as Multiple-Transaction Based Property Valuation (MTV). Instead of choosing only one prior transaction, MTV uses multiple transactions for a given property to provide a more accurate mark-to-market value. Preferably, a weighted combination of mark-to-market values provided by an HPI and individual ones of the multiple transaction records provide a predicted value for the given property. Weighting factors recency and transaction type to correct for both sources of potential inaccuracy.

According to still another aspect, the present invention provides a system that includes elements that perform data cleaning with idiosyncratic error control, HPI estimation with systematic bias control, and property value prediction that uses multiple transactions.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
FIG. 1 is a block diagram illustrating an embodiment of a computer system that includes property value estimation with bias correction.

FIG. 1 is a block diagram illustrating an embodiment of a computer system 100 including a property value estimation module 150 in accordance with the present invention. The computer system 100 may be a conventional desktop computer, a network computer, a handheld portable computer (e.g., PDA, cell phone) or any of various execution environments which will be readily apparent to the artisan and need not be named herein.

The property value estimation module 150 runs on a conventional operating system in memory 130 and carries out the described functionality by execution of computer instructions. Operating systems may include but are not limited to Windows, Unix, Linux and Macintosh. The computer system may further implement applications that facilitate calculation including but not limited to MATLAB. The artisan will readily recognize the various alternative programming languages and execution platforms that are and will become available, and the present invention is not limited to any specific execution environment.

Although the property value estimation module 150 is preferably provided as software, it may alternatively be hardware, firmware, or any combination of software, hardware and firmware.

In one embodiment, a computer system includes the property value estimation module 150 resident in memory 130 on a conventional computer system, with the property value estimation module 150 including instructions that are executed by a processor 120. Alternative embodiments include an article of manufacture wherein the instructions are stored on a computer readable storage medium. The medium may be of any type, including but not limited to magnetic storage media (e.g., floppy disks, hard disks), optical storage media (e.g., CD, DVD), and others. Still other embodiments include computer implemented processes described in connection with the property value estimation module 150 as well as the corresponding flow diagrams.

For some applications there is a need to supplement data from purchase transactions, typically because there is not enough purchase transaction data to adequately estimate home price indices. For example, in some applications there is a need to estimate home price indices for small geographical locations (e.g., at the ZIP code level), but there often is insufficient purchase transactions data to adequately estimate home price indices at the ZIP code level. In these instances, it may be desirable to use non-purchase transaction data.

According to one aspect of the present invention, the property value estimation module 150 accommodates estimation of property values in situations where the dataset is insufficient to support home price index estimation using data solely originating from purchase transactions. This aspect is described further below, and in connection with the description of FIGS. 2-4. According to another aspect, the property value estimation module 150 implements multiple transaction based property valuation, wherein multiple transactions are used in connection with a repeat sales based home price estimation index to predict property prices. This aspect is primarily described in connection with FIGS. 5-9.

Property value estimation according to the first aspect is described as follows. The data is segregated into purchase transactions and non-purchase transactions. Then, for relatively large geographical areas (e.g., census regions, MSAs, etc.), a repeat sales model is applied using the purchase transactions data to provide a base property price index. The base property price index may be referred to as the "Trunk" HPI.

The base property price index is used to calibrate the median bias for non-purchase transactions, for each questionable loan segment, for each relatively large geographical area, and for each time period. This is accommodated by determining a property level bias corresponding to each non-purchase transaction value, grouping the determined property level biases, and determining the median bias for each group.

The determined biases are then used to adjust the non-purchase transaction data. For each piece of data (i.e., each value), the adjustment is made according to which groups the corresponding property belongs. More specifically, the property corresponding to a non-purchase transaction value is within a given large geographical area, and the non-purchase transaction is of a particular loan segment type and from a particular time period. The non-purchase transaction value is thus adjusted because of its membership in these groups, based upon the median bias attributed to such groups in the previous step. Each value in the non-purchase transaction data is adjusted accordingly. This may also be referred to as treating the data for the determined biases. Collectively, the bias treated data and the purchase data provide adjusted transaction data.

For relatively small geographical units such as ZIP code, a repeat sales model is then applied to the adjusted transaction data to provide a localized property price estimation index. That index is then used to predict the value for a given property in the small geographical unit. The localized index may be referred to as a "Branch" HPI.

As introduced above, it is recognized that different loan segments imply different degrees of valuation bias. Those transactions that are less prone to valuation bias may generally be referred to as trusted transactions, and the counterpart transactions that are more prone to bias may be referred to as questionable, or questioned transactions. Although the preferred example described in this section construes purchase transactions as trusted and non-purchase transactions as questioned transactions, the present invention should not be construed as limited to that particular embodiment. Additionally, as will be evident in the following description, there may be more than two loan segment categories, such that there are more than two levels of bias treatment for the data.

Although the present invention could be implemented with any trusted and questioned transaction types, for ease of description the example of purchase transactions and non-purchase transactions is used throughout.

Figure 2:
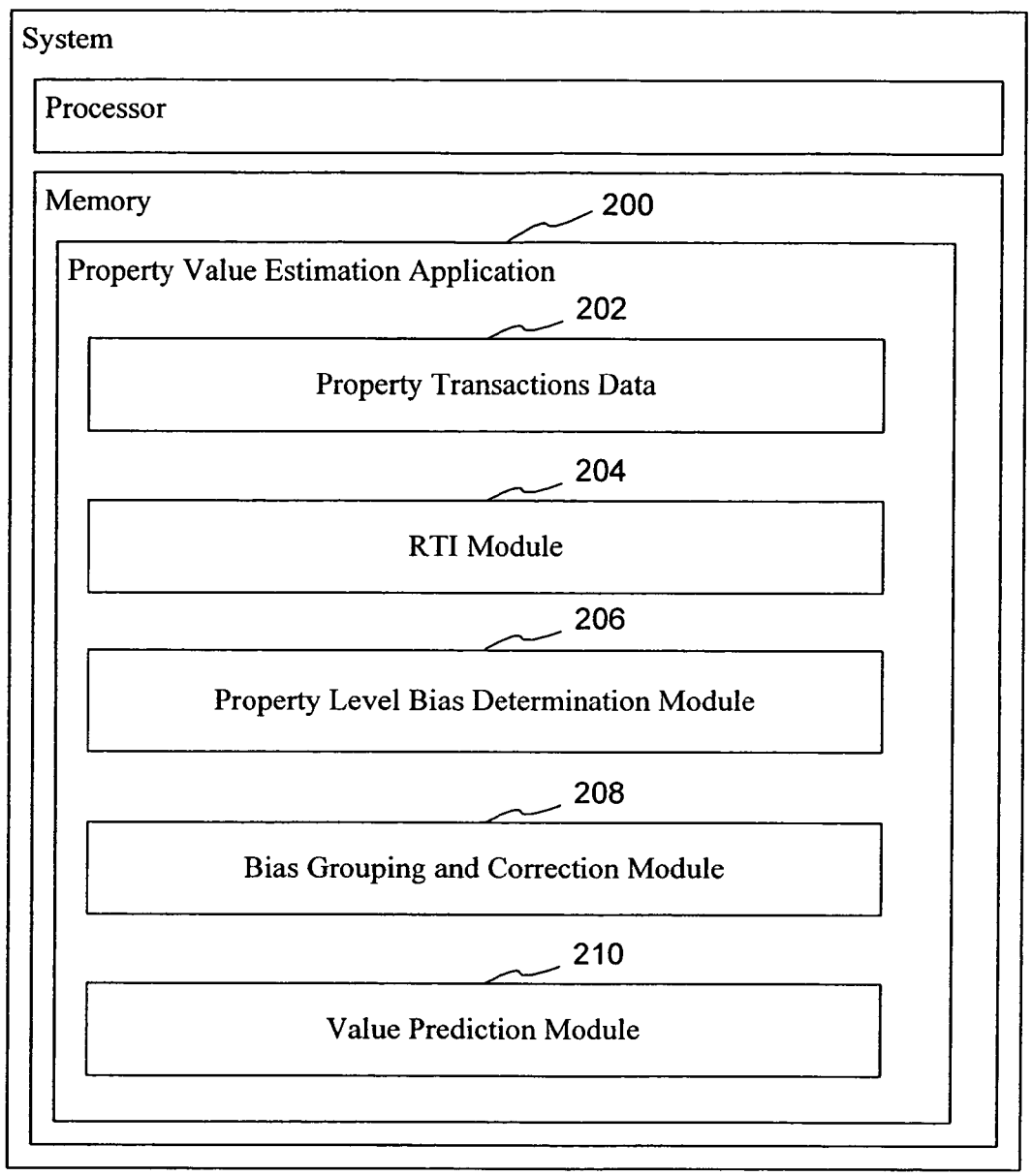
FIG. 2 is a block diagram illustrating an embodiment of a property value estimation application.

FIG. 2 is a block diagram illustrating an embodiment of a property value estimation application 200 in accordance with the present invention. As with the computer system of FIG. 1, this embodiment may implement any execution environment which is or may become available, including but not limited to a computer workstation containing a processor that executes instructions stored in memory. Although one modular breakdown 202-210 is described, such is provided by way of example only, as the functionality of the property value estimation application 200 may be provided in any number of alternative designs having greater or fewer component modules.

The property value estimation application 200 includes a property transactions database 202, an RTI module 204, a property level bias determination module 206, a bias grouping and correction module 208, and a value prediction module 210.

The property transactions database 202 includes data from transactions of various types. Conventional data management techniques may be used to organize the data. The information may be organized at a property specific level, with associated characteristics. These characteristics include the value of the property, the transaction type from which the value was established, the date or time period, and property location information. The data may come from one or more of various sources, including but not limited to a GSE database of information concerning acquired loans, data exchanges between GSEs, and data provided by data aggregators.

In addition to storing the property transactions information, the property transactions database 202 may be used to manage data as it is treated to correct for bias, as described further below. This may be accommodated by providing additional fields in association with the above described property level records, or by updating existing fields.

The RTI module 204 accommodates the determination of property price indices. In one embodiment, the RTI module 204 implements a repeat sales model to determine such indices. Generally, repeat sales methods of estimation use property values taken at periods or points in time and use such values to estimate a price index. The RTI module 204 may implement any available model to estimates home price indices, including but not limited to the previously introduced Bailey et al. and Case-Shiller implementations.

The property level bias determination module 206 determines a property level bias by examining values in the data and determining the difference between such values and the values that are predicted based upon trusted values such as those from purchase transactions. To do this, the property level bias determination module 206 operates in conjunction with the property transaction database 202 and the RTI module 204.

First, a base (Trunk) HPI is determined, preferably using purchase transactions, and preferably corresponding to a relatively large geographical unit to ensure that there is sufficient data to produce a viable index. Then, values originating from other transactions types are accessed and a property level bias is determined. This is done by obtaining a non-purchase transaction value corresponding to a particular property at a given time period, and then using the Trunk HPI to determine the predicted value for the particular property at the given time period, and comparing that value to the value provided by the non-purchase transaction. This process is repeated by the property level bias determination module 206 for each of the various properties in the relevant geographical area.

The bias grouping and correction module 208 receives this information and then groups the determined property level biases by predetermined characteristics, and determines correction factors that are applicable at the group level. One example of a group correction factor is a median bias for the non-purchase transaction values, for properties having a particular group characteristic. Examples of groups are transaction type (which may also be referred to as loan segment), geographical area, and time period. Once a group correction factor is known, it can be applied to individual values within each particular group. In other words, non-purchase transaction values are corrected according to the median biases for the groups (type, area, period) to which each value belongs. Each value in the non-purchase transaction data is adjusted accordingly, to provide a set of treated transaction data. The grouping and correction of data is described further with reference to the flow diagrams of FIGS. 3A-B below.

The property transactions database 202 is thus updated to include the purchase transaction data along with the treated non-purchase transaction data. Collectively this data may be referred to as the adjusted transactions data. The adjusted transactions data is sufficient to generate HPIs respectively corresponding to relatively smaller geographical areas that fall within the large geographical area. These HPIs may be referred to as localized or "Branch" HPIs. Any conventional repeat sales model may be used to generate the localized HPIs, again as provided by the RTI module 204.

The value prediction module 210 communicates with the RTI module 204 to access the relevant localized HPI for a particular property being evaluated. It determines the MTM value in the usual fashion, based upon the localized HPI and a transaction value corresponding to the particular property.

Figure 3A:
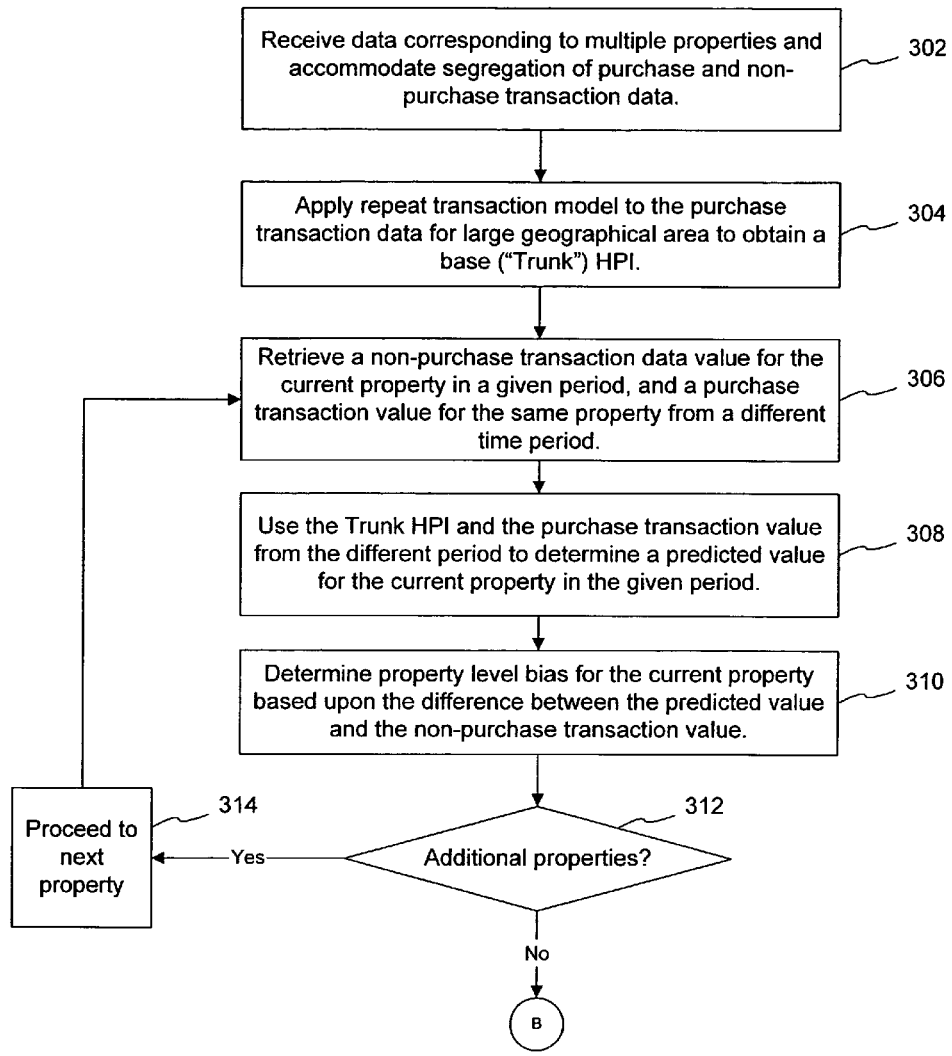
FIGS. 3A-B are flow diagrams illustrating an embodiment of a process for property value estimation with transaction bias correction.
Figure 3B:
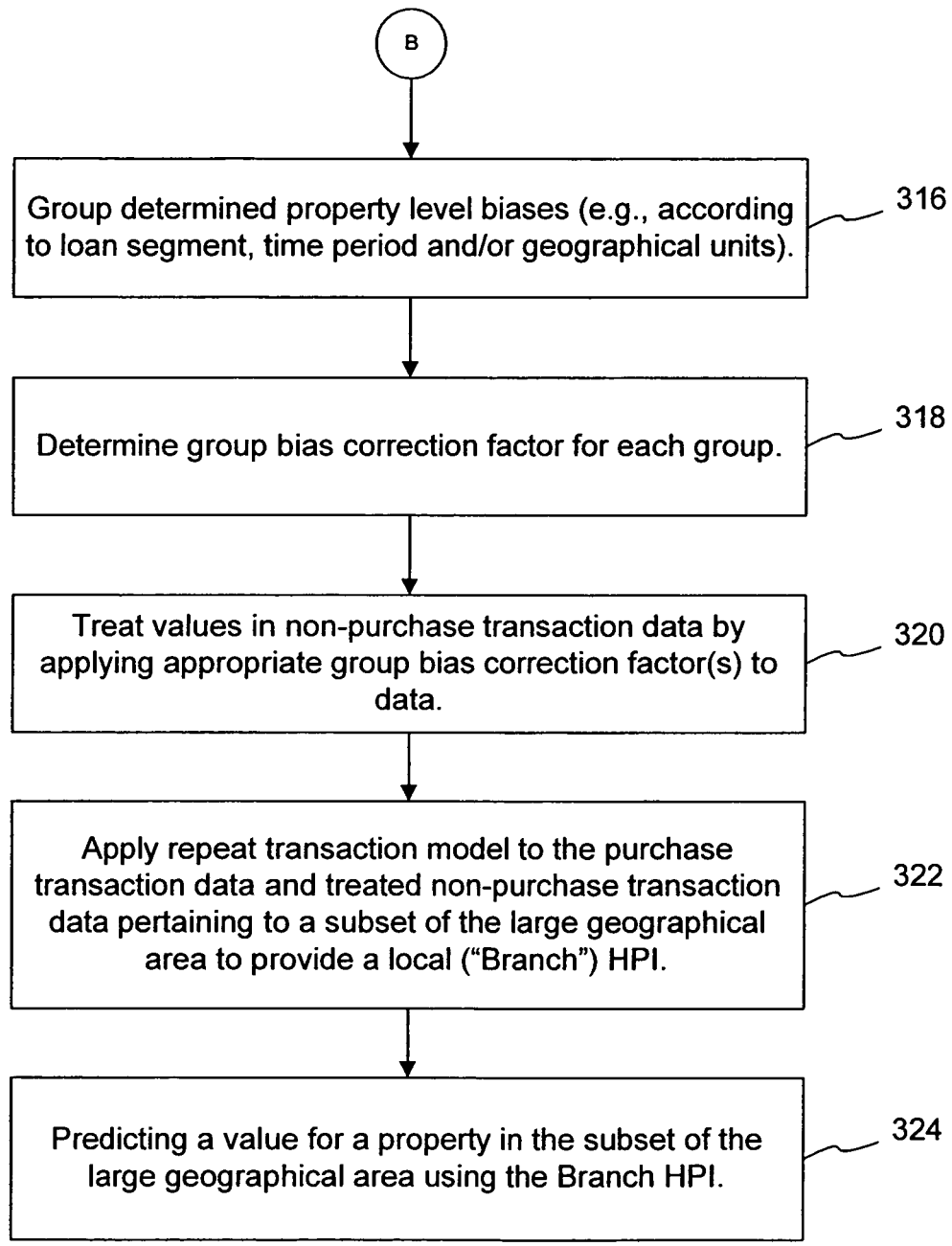

FIGS. 3A-B are flow diagrams illustrating an embodiment of a computer implemented process 300 for property value estimation with transaction bias correction in accordance with the present invention, and further describe the functionality of the property value estimation application (200, FIG. 2).

Initially, records corresponding to numerous properties are received 302 and segregated according to the transaction type from which they originated, preferably according to purchase and non-purchase transaction types as described. Also as described, characteristics such as the applicable time period and location for the property are associated with each property value.

A repeat transaction model is then applied 304 to the purchase transaction data. Preferably, for each large geographical unit (e.g., census areas, large MSAs) for which there are abundant purchase transactions, the repeat sales model is applied to provide a base price estimation index ("Trunk HPI").

The Trunk HPI is then used to calibrate bias correction. Preferably this is done by determining biases for individual properties (i.e., determining a property level bias), and then using the determined biases to calculate group level bias correction factors. In one embodiment, the group correction factor is a central tendency such as median bias, for groups defined according to loan segment, large geographical unit, and time period. An example of determining this information is described further below in connection with the description of the valuation bias matrix (VBM).

An initial phase of calibration of the median bias is the determination of the property level bias, which is described in connection with process steps 306-314. For each property in question, a value from a non-purchase transaction is retrieved 306 from a given time period, as is a purchase transaction value from a different period. The Trunk HPI is then applied 308 to the trusted value, to determine a predicted value for the property in question at the given time period. This predicted value is then compared to the non-purchase transaction value to determine 310, with the difference indicating the bias. The determined bias corresponds to an individual property and thus is referred to as a property level bias. In this fashion, all of the non-purchase transaction values are analyzed by proceeding 314 through each property for which non-purchase transaction values are available. The process continues until it is determined 312 that there are no additional properties.

Continuing with reference to FIG. 3B, the property level biases are then grouped 316 according to defined characteristics. In one embodiment, the groups are transaction type, time period and geographical units. For example, for the "refinance" loan segment, the property level bias corresponding to each of the above described values that originated from refinance transactions may be retrieved as a set of data.

The group bias correction factor is then determined 318 for each group. As described, one example of a group bias correction factor is a median bias. From the values in the retrieved set of data for each group, the median bias is easily determined according to standard mathematical techniques. The non-purchase transaction data is then treated 320 for bias by applying the group bias correction factor(s) appropriate for each value.

The treated data and the purchase transaction data collectively provide adjusted transaction data that includes enough data to support the generation of viable localized HPIs, with correction for the various biases built in by the data treatment prior to generating such HPIs. This is done by applying 322 a repeat transaction model to the adjusted transaction data pertaining to a subset of a large geographic area to provide a localized HPI for that area. The area may be a relatively small geographical unit such as a particular ZIP code. Again, any conventional model may be applied to the adjusted transactions data to provide the localized HPIs.

Once the localized price estimation index is established, conventional techniques may then be used to predict 324 a value for a property in the subset geographical area, wherein the property value is predicted by application of the localized price estimation index.

Figure 4:
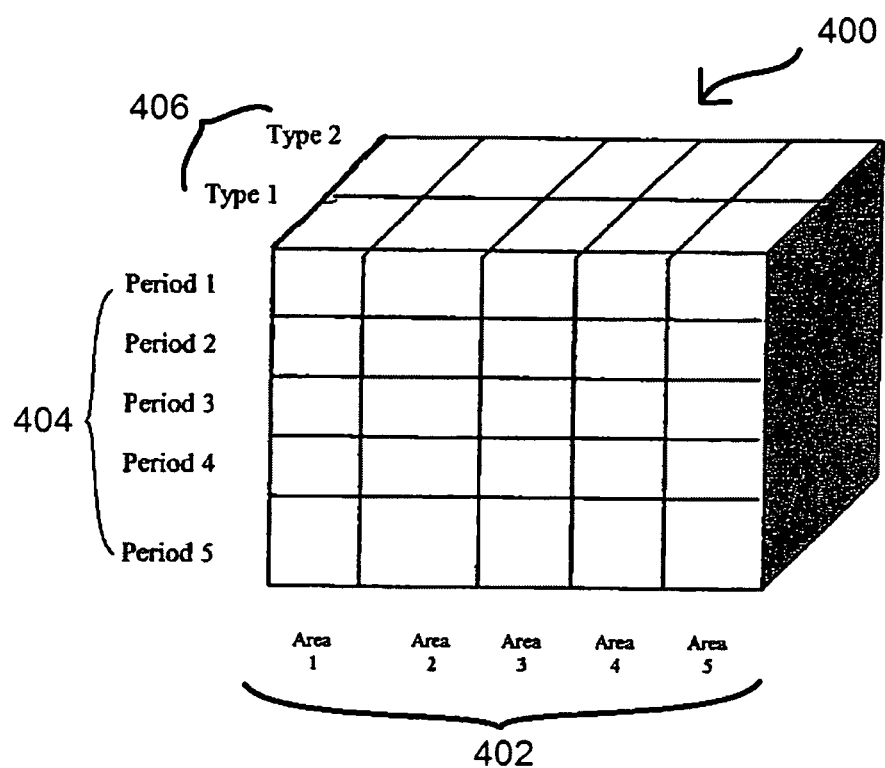
FIG. 4 is a schematic diagram illustrating components of a valuation bias matrix.

FIG. 4 is a schematic diagram illustrating components of a VBM 400. The VBM 400 may be used to determine and apply the above described bias correction factors. The axes of the VBM 400 include area (402), period (404) and type (406).

An example of a traditional RTI model specification that may be implemented is provided as Equation 1 below. Specifically, let $P^i_t$ and $P^i_s$ be the two repeated transaction prices for property i observed at two different time periods, t and s, assuming s precedes t. The traditional RTI model specification is:

$$\log(P^i_t) - \log(P^i_s) = I_t - I_s + \epsilon^i_{st}, \quad \text{(Eq. 1)}$$

where $I_t$ is the HPI in logarithm to be estimated, and $\epsilon^i_{st}$ is the cross-sectional disturbance term that has zero mean. In one embodiment, the estimated parameters of the RTI model represent HPIs that are piecewise constant functions of time.

Each basic time interval (usually a calendar quarter) is deemed to have the same house price level.

Treatment of heteroskedasticity can also be accommodated under the assumption that the variance is a quadratic function of t−s. One treatment referred to as a Feasible Generalized Least Square (FGLS) method, comprises (1) Running Ordinary Lease Squares (OLS) regression (based on Eq. 1) and saving the residuals; (2) fitting the squared residuals with some quadratic function of t−s., then using the estimated quadratic function to predict the estimated observation-specific variance (some procedure has to be in place to ensure the estimated variances are all positive); and (3) using the estimated variance to weight all the observations and then re-run the OLS regression using the weighted data.

The RTI model is used to determine the base "Trunk" HPI corresponding to each relevant large geographical area (e.g., census areas and/or MSAs), using only the purchase transaction data. The Trunk HPI and all of the transaction data are then used to compute the VBM 400 for each large geographical area. Then, the VBM 400 is used to treat the raw data corresponding to all of the transactions. The treated data is then used to estimate the localized, Branch HPI for relatively small (compared to the large geographical areas) local markets, such as counties or zip codes.

Under the assumption that purchase transactions have no systemic bias, the VBM 400 is calibrated using such transactions as benchmarks. It is also assumed that for the non-purchase transactions, the magnitude of valuation bias varies over region, time period and transaction type. Accordingly, the VBM 400 is three dimensional, with the valuation bias calibrated for each time period, each area, and each transaction type.

Various biases have been documented in property valuation. For example, cash out refinances typically have larger bias than rate/term refinances. This may be because borrowers have an incentive to reduce the loan to value (LTV) ratio to less than 80% to avoid the payment of mortgage insurance. These and a multitude of other biases may be present.

The VBM 400 may be arranged as the practitioner desires. For example, it may be limited to two types—purchase transactions or non-purchase transactions. Some data may be excluded from the overall data so that certain non-purchase transactions will be excluded while others will be included in the original set of data. For example, the practitioner may want to omit cash-out refinances alltogether. The VBM 400 may also include three (or more) types, such as (1) "purchase", (2) "cash-out refinance", and (3) "rate/term refinance". A practitioner is free to choose how to define transaction types, based upon the richness of his/her data and on the desired granularity of the analysis. For example, when working with mortgage refinance data, one might define a transaction type as the interaction between refinance purpose and LTV buckets.

The VBM 400 is arranged to determine and calibrate bias correction factors as follows. If there are a total of I periods, J areas, and K types, the whole VBM has I*J*K elements. The generic notation $b_{ijk}$ thus corresponds to the valuation bias for Period i, Area j, and Type k. Continuing with the example where it is assumed that purchase transactions have no systemic bias, all the purchase transactions are designated as Type 1, and thus:

$$b_{ij1}=0 \text{ for all } i \text{ and all } j. \tag{Eq. 2}$$

To numerically calibrate $b_{ijk}$ for k≠1, first each non-purchase transaction is paired to an available purchase transaction for the same property. Then, calculate the mark-to-market (MTM) value using the matched purchase transaction and the trunk HPI, using the following formula:

$$\hat{P}_t = P_s \exp\{\hat{I}_t - \hat{I}_s\}, \tag{Eq. 3}$$

where $P_s$ is observed value of a purchase transaction in period s. We use it as the benchmark to predict the property value, $\hat{P}_t$, for a non-purchase transaction in period t. $\hat{I}_t$ and $\hat{I}_s$ are the estimated large geographical area-specific Trunk HPI.

To compute the valuation bias for in the observed non-purchase transaction value $P_s$, the log difference is calculated:

$$B = \log(P_t) - \log(\hat{P}_t) \tag{Eq. 4}$$

After all the property-level valuation biases are derived using Eq. 3 and Eq. 4, all the elements of the VBM 400 may be defined as the central tendency (such as median or mean) of the property-level valuation biases that share the same period, area, and transaction type, that is, $$b_{ijk} = \text{median}(B) \text{ for all transaction } B \text{ whose non-purchase transaction is in period } i, \text{ in area } j, \text{ and transaction type } k. \tag{Eq. 5}$$

After the VBM 400 is calibrated, it is used to treat the values of the non-purchase transactions by adjusting them according to the following equation:

$$\tilde{P}_t = P_t \exp\{-b_{ijk}\} \tag{Eq. 6}$$

if transaction $P_t$ is in period i, in area j, and of type k.

Note that a purchase transaction (k=1) gets no adjustment, because it embodies no systematic bias, and by construction, $b_{ij1}=0$ for all i and all j.

Following the treatment of the data, the localized or Branch HPIs are then estimated using the pre-treated data $\tilde{P}_t$.

In general, the mark-to-market process will bring the house prices of previous transactions to the current period, denoted by T. The mark-to-market value of a house at current time period T will be:

$$\hat{P}_T^i = P_t^{i*} \exp\{-b_{ijk}\} * \exp\{\hat{I}_T - \hat{I}_t\}, \tag{Eq. 7}$$

where both $\hat{I}_T$ and $\hat{I}_t$ are estimated branch HPI, as opposed to Eq. 3 where the HPI used were trunk HPI. Notice again that a purchase transaction (k=1) gets no adjustment, because it embodies no systematic bias, and by construction, $b_{ij1}=0$ for all i and all j.

This embodiment of the present invention thus provides increased coverage and increased accuracy in MTM value prediction. The coverage measures the percentage of the houses that one can value for a set of addresses randomly given by a customer. As compared to implementations of the Case-Shiller model that use only purchase transactions, this aspect of the present invention uses both purchase and non-purchase transactions to estimate HPIs that are used to predict property values. Among other things, this provides increased coverage because it allows more data to be used. As compared with the OFHEO paradigm, this aspect of the present invention controls and corrects the embedded valuation bias. Therefore, it produces improved local market HPIs and predicts the house prices with increased accuracy.

According to another aspect, the present invention provides data cleaning that mitigates idiosyncratic errors. With regard to duplication, data cleaning according to this aspect helps to ensure that the most accurate record is retained for a transaction. This is preferably accommodated by ensuring that the retained record is the most consistent with other transactions of the same property, the local market trend, and neighborhood market. Additionally, algorithms accommodate the adoption of a value as a representative single record for a transaction where multiple records are present for a transaction. Following duplicate removal, data cleaning further eliminates erroneous records by eliminating transaction outliers. This is preferably also based upon the local market trend, along with all of the remaining transactions for each given property. The data cleaning aspect may also be referred to as Market Based Data Cleaning (MBDC).

According to still another aspect, the present invention provides property valuation that uses multiple transaction. This may be referred to as Multiple-Transaction Based Property Valuation (MTV). Instead of choosing only one such prior transaction, MTV uses multiple transactions to provide a more accurate mark-to-market value. Preferably, the HPI is applied to a weighted combination of all transactions to accommodate this. Further, the weighting may implement recency and transaction type to correct for both sources of potential inaccuracy.

Figure 5:
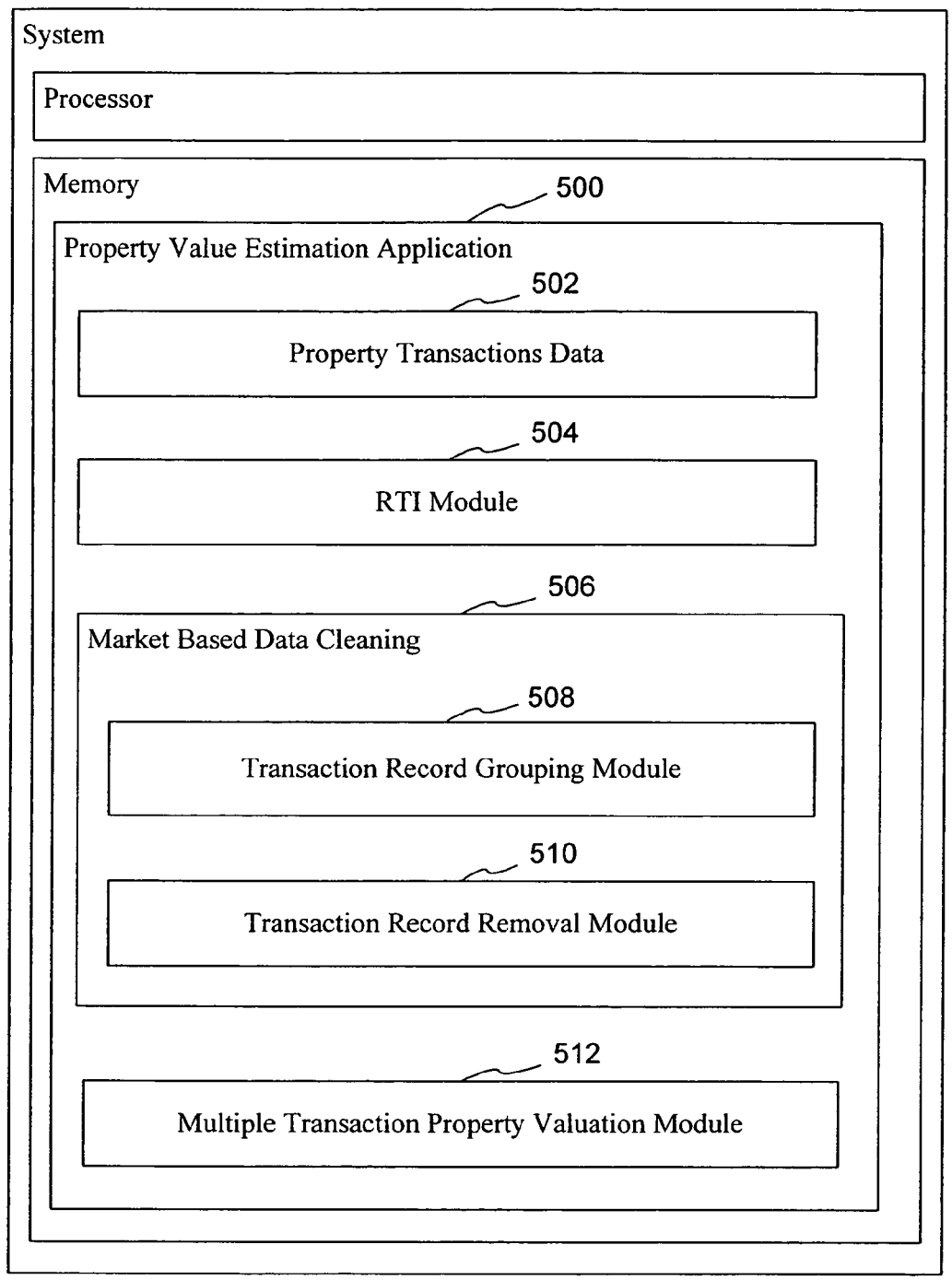
FIG. 5 is a block diagram illustrating an embodiment of a property value estimation application that includes multiple transaction based property valuation and data cleaning.

The data cleaning and MTV aspects of the present invention are described in connection with FIGS. 5-9. FIG. 5 is a block diagram illustrating an embodiment of a property value estimation application 500 that includes multiple transaction based property valuation. As with the computer system of FIG. 1, this embodiment may implement any execution environment which is or may become available, including but not limited to a computer workstation containing a processor that executes instructions stored in memory. Although one modular breakdown 502-510 is described, such is provided by way of example only, as the functionality of the property value estimation application 500 may be provided in any number of alternative designs having greater or fewer component modules.

The property value estimation application 500 includes property transactions data 502, an RTI module 504, a market based data cleaning module 506 that includes a transaction record grouping module 508 and a transaction record removal module 510, and a multiple transaction property valuation module 512.

The property transactions data 502 includes data from transactions of various types. Conventional data management techniques may be used to organize the data. The information may be variously organized and include various characteristics as desired by the practitioner. Preferred characteristics include the value of the property, the transaction type from which the value was established, the date or time period, and property location information.

The RTI module 504 accommodates the determination of HPIs, preferably implementing a repeat sales model to estimate the indices. The RTI module 504 may implement any available model to estimates home price indices, including but not limited to the previously introduced Bailey et al. and Case-Shiller implementations. If desired, the RTI module 504 may also implement a localized Branch HPI that is generated using the previously described aspect of the present invention.

A transaction may be thought of as an action related to a given property, such as a purchase or a refinancing. Each transaction should preferably have one record. However, you may have more than one record because of redundancy. The transaction data may refer to all of the records that are being analyzed pursuant to a particular calculation (e.g., all of the records corresponding to a large geographical area, or for a zip code, whatever is relevant). The MBDC module 506 accommodates the removal of redundant transactions as well as transactions that are determined to be improperly associated with a given property, to produce a cleaned set of transaction data. The data cleaning aspect may be used in conjunction with any property valuation technique. For example, the data cleaning aspect may be used in conjunction with TB-RTI as described previously, multiple transaction based property valuation as described below, or both as described in connection with FIG. 10 below.

Still referring to FIG. 5, the transaction record grouping (TRG) module 508 groups transaction records. Millions of property data records are typically obtained from several data providers and stored in the property transactions database 502. The TRG module 508 groups these various transaction records are into properties according to the records' address field. Then the records belonging to each property are grouped into transactions if the records fall into a determined window of time, such as 45 days. This identifies records as belonging to successive periods, or windows, along a time line.

The transaction record removal (TRR) module 510 is in communication with the TRG module 508. Preferably the TRR module 510 removes redundant records and inconsistent records, and preferably implements a market trend defined by a relevant, existing HPI to make decisions in that regard. Records removal is described further below in connection with FIGS. 7-8.

The multiple transaction property valuation module 512 is in communication with the TRR module 510 and thus receives the transaction records, with the redundant and inconsistent records having been eliminated. The multiple transaction property valuation module 512 preferably utilizes a weighted average of MTM values determined from multiple separate transactions in order to produce an overall predicted value for a given property. An example of equations implemented to accommodate this process is described further below, following the description of record removal.

Figure 6:
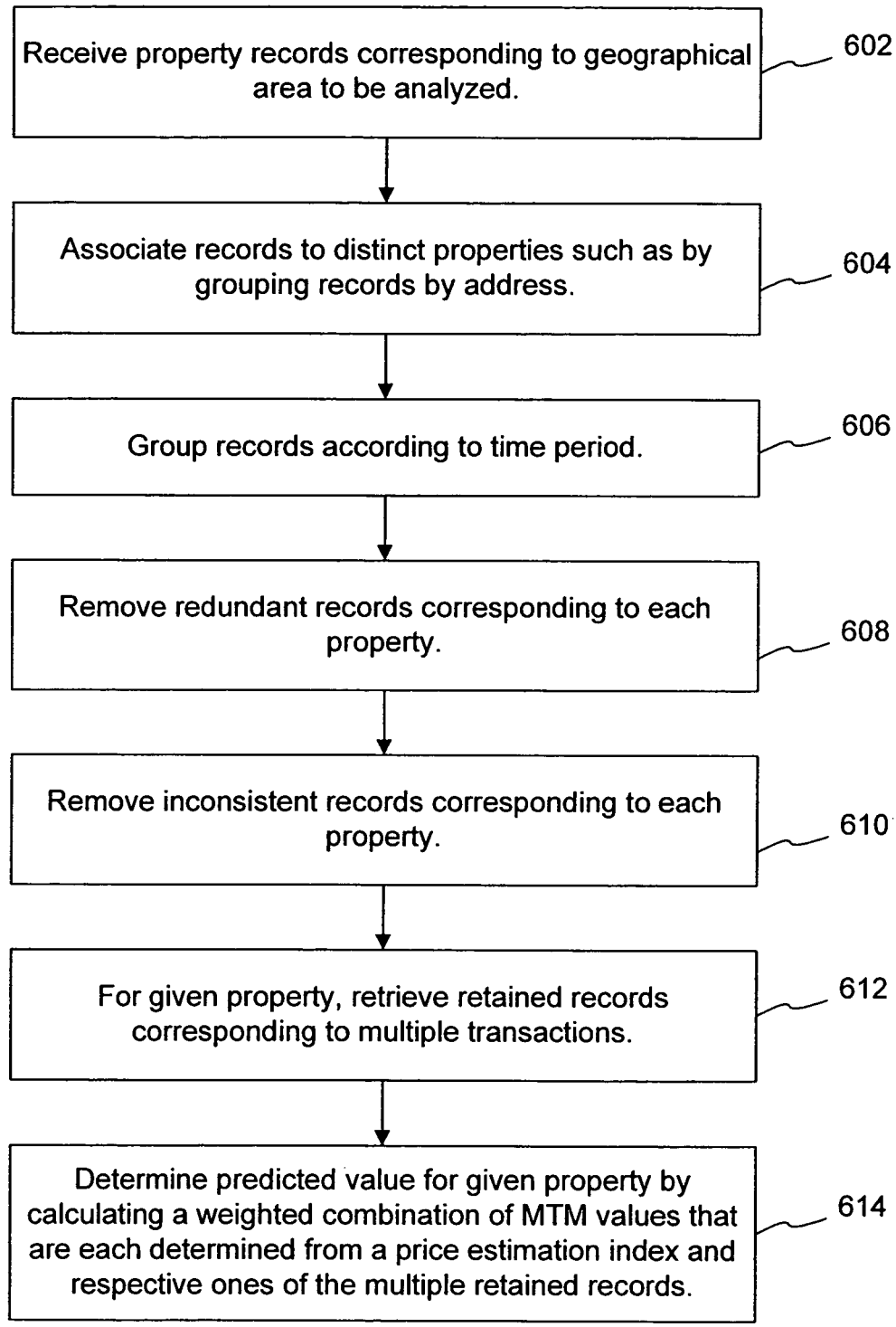
FIG. 6 is a flow diagram illustrating an embodiment of a process for multiple transaction based property valuation.

FIG. 6 is a flow diagram illustrating an embodiment of a process 600 for multiple transaction based property valuation. The process 600 initially comprises the receipt 602 of property records, which as described may be millions of records from various sources. For an analysis, those records pertaining to an analyzed geographical area will be relevant to the prediction of values. The records are then associated 604 with distinct properties. This is most readily accommodated by accessing the address information in the records, with a common address assumed to correspond to a common property. A given property may have numerous associated records. For each property, the records are grouped 606 according to the time period in which they reside. A series of time period windows may be initially defined, with the grouping simply being determined according to which window the date for a given record falls.

Redundancy is then removed 608 by removing records or otherwise determining a representative value where multiple records correspond to a single time window. For example, where there are multiple records corresponding to a given time window, the average value given by those records may be used as the representative record for that given time period. Sometimes, however, records will be discarded. For example, if there are two records, with one being very divergent from a market expectation, that record might be discarded in favor of using the value that is closer to the market expectation.

Figure 7:
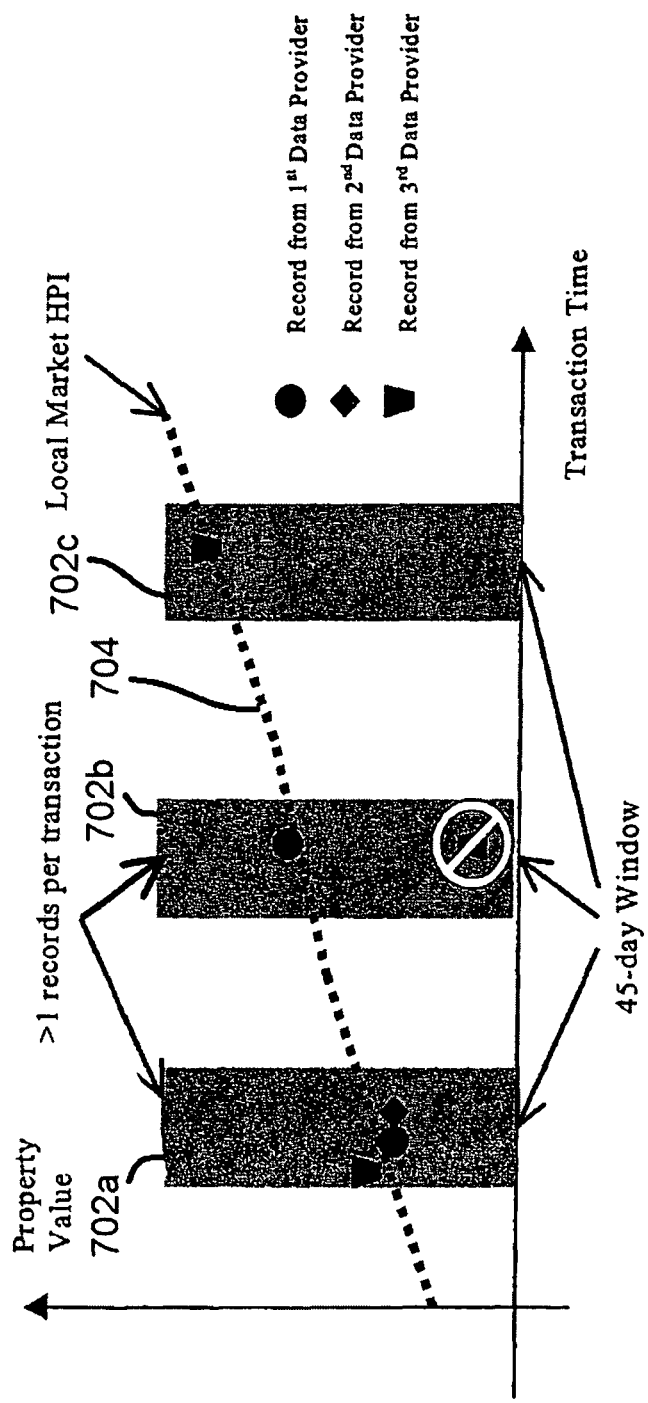
FIG. 7 is a graphical diagram schematically illustrating redundant record removal in conjunction with data cleaning.

FIG. 7 is a graphical diagram 700 that conceptually illustrates redundant record removal. The graphical diagram 700 includes transaction time and property value axes, with periods of time 702a-c sequentially depicted along the time line. As indicated by the legend, numerous records originating from $1^{st}$, $2^{nd}$, and $3^{rd}$ providers are plotted on the graphical diagram 700.

The diagram also includes a dotted line denoted as the local market HPI 704. The local market HPI is typically for a relatively small geographical area such as zip code. In embodiments that also implement TB-RTI, the local market HPI may be a Branch HPI. According to the data cleaning aspect of the present invention the local market HPI may be used to accommodate the reconciliation of record redundancy and removal of erroneous "outlier" records. The local market HPI may be plotted on a relative scale and provides an indication of expectations for the local market. The local market HPI is therefore used to determine deviations from expectations for the local market, which in turn determines the algorithm for reconciling redundancy.

As indicated in the first window 702a, three records are shown clustered about a fairly common value. In situations like this, it is preferable to determine a representative value, such as simple average or selection of whatever value is determined to be the best representative.

As indicated in the second window 704b, the separation of the values for the two records is relatively large. Here, one of the values may be eliminated in lieu of averaging them. A preferred tool for accommodating elimination is the local market HPI. The local market HPI may be determined from the data for a locality, and this determination may be made prior to the data cleaning process of this aspect of the present invention. The previously described HPI determination technique or any available alternative technique for determining the local market HPI may be used. Still referring to the values in the second window 704b, the record having a value closer to the local market HPI is retained, and the other (divergent) value is discarded.

A detailed example of the logic for handling the situation where a transaction of a property has multiple presumed redundant records (i.e., records within a window) is as follows:

1) If the price differences of the duplicates are small and there are only two duplicate records, retain the record by a predetermined data provider reliability hierarchy.

2) If the price differences of the duplicates are small and there are more than two duplicate records, retain the record with the price closest to the mean of the duplicate records.

3) If the price differences of the duplicate records are large, and the average of the MTM values of the property's other transactions is available, then retain the record with price closest to the average MTM value. The average MTM value may be determined by using the local market HPI and each record to provide several MTM values, and then averaging those value.

4) If the price differences of the duplicate records are large and no average of MTM values of the property's other transactions is available, then (a) for cases with two duplicates, retain the record with the price closest to the MTM of local market average property price; (b) for cases with more than two duplicate records and the average price of duplicates is close to the MTM of local market average property prices, retain the records with price closest to the average of the duplicates; and (c) for cases with more than two duplicate records and the average prices of duplicates is far from the MTM of local market average property prices, retain the records with price closest to the local market average price.

If the data provider reliability hierarchy is implemented, such can be variously determined by the practitioner, typically based upon knowledge of the industry and experience with particular providers.

Figure 8:
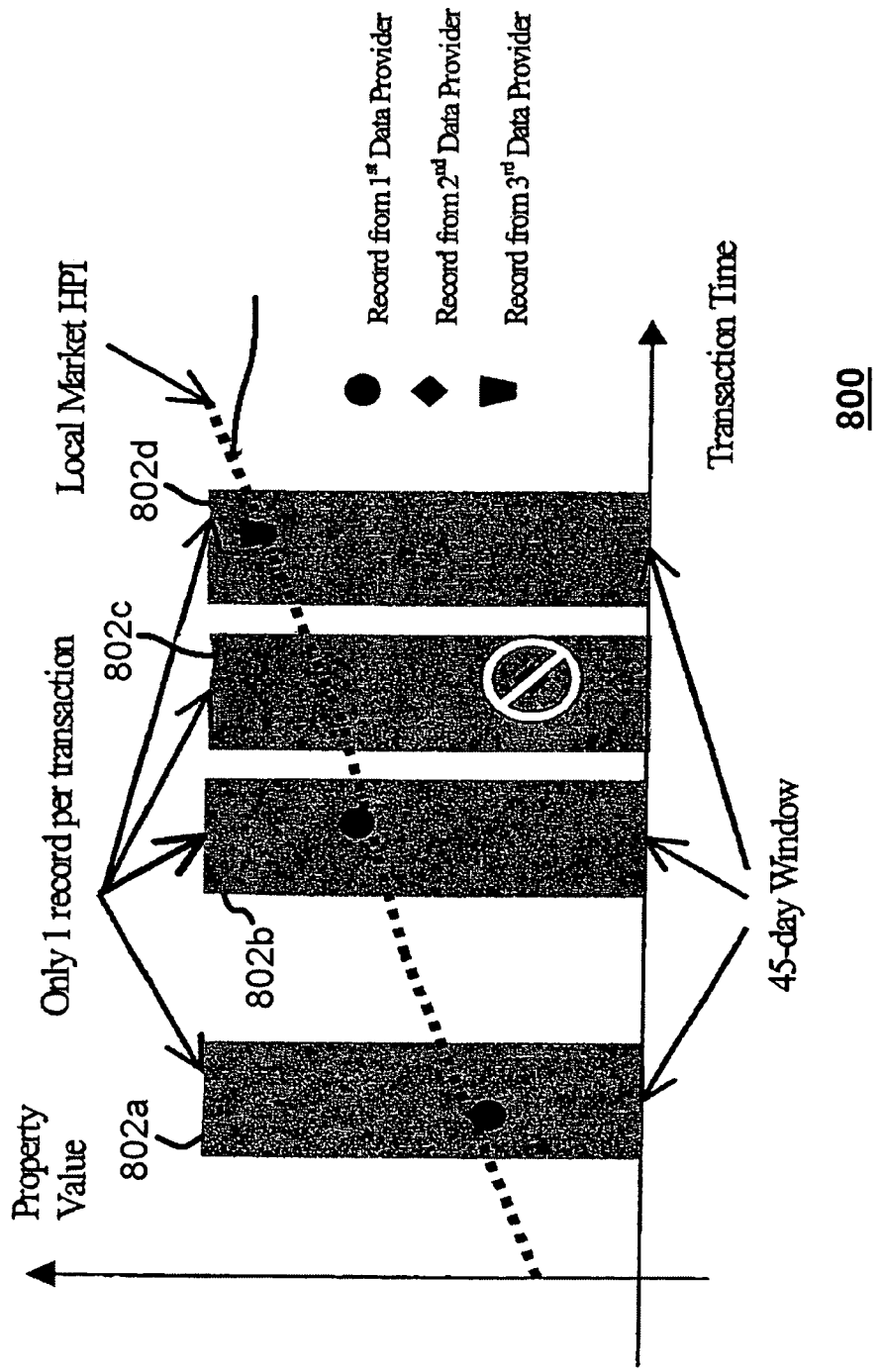
FIG. 8 is a graphical diagram schematically illustrating inconsistent record removal in conjunction with data cleaning.

Once the redundant records have been removed 608, inconsistent records are removed 610. At this stage, there is preferably at most one representative record for each defined time window. An inconsistent record may have a value that is not consistent with the values provided from other records for the property and/or a market suggested value. FIG. 8 is a graphical diagram 800 that conceptually illustrates inconsistent record removal. As was the case with the previous graphical figure, the graphical diagram 800 includes transaction time and property value axes, with time windows 802a-d depicted along the time line. Again, numerous records originating from $1^{st}$, $2^{nd}$, and $3^{rd}$ providers are plotted on the graphical diagram 800, and as is the local market HPI 804. As is evident from the diagram, the value corresponding to the record belonging to time window 802c is divergent from both the value suggested by the market, and the value corresponding to the other records. In this instance, the divergent record is discarded.

As indicated, inconsistent data removal preferably implements the other transactions of the property and local market information. As with redundancy removal, inconsistency removal can be variously provided by the artisan, but an example follows:

1) If the property only has one transaction, remove the data if the value of the property is too far from the local market average (e.g., more than twenty times or less than one-twentieth of the local average).

2) If the property has two transactions and the MTM values of the two transactions are very different, remove the transaction with the MTM value that is further from the local market average.

3) If the property has more than two transactions and the MTM values of the transactions have large differences, then: (a) if the average of MTM values of all transactions is close to local market average, remove the transaction with MTM value farthest from the average of MTM values of the transactions; and (b) if the average of MTM values of the transactions is far from local market average, remove the transaction with MTM value farthest from the local market average.

The process may be repeated a number of times to ensure that one has a thoroughly cleaned set of data.

Still referring to the flow diagram of FIG. 6, the data cleaning that results from removing 608, 610 redundant and inconsistent records results in a retained set of records that may be accessed 612 for a determination of the predicted value for a given property. After the data cleaning, multiple transactions will still remain for the given property. The determination 612 of the predicted value preferably implements a weighted combination of MTM values that are each determined from a price estimation index and respective ones of the multiple retained records. Preferably, the weight for each transaction value is inversely proportional to the variance of its MTM value.

A specific example involving the previously described HPI is provided as follows.

The MTM values of the property based on multiple transactions may be initially computed as described with reference to Eq. 7 in connection with the previously described aspect of the present invention. Then the predicted price of the property based on the multiple transaction valuation model will be computed from:

$$\log(\hat{P}_T^i) = w_1^i \log(\hat{P}_{T,1}^i) + w_2^i \log(\hat{P}_{T,2}^i) + \ldots \quad \text{(Eq. 8)}$$

where $\hat{P}_{T,1}^i$, is the MTM value of the property based on its first transaction, $w_1^i$ is the weight of the first transaction, and so on for the second and later transactions.

The weights are computed by:

$$w_j^i = \frac{1}{v_j^i} \bigg/ \left[ \frac{1}{v_1^i} + \frac{1}{v_2^i} + \ldots \right] \quad \text{(Eq. 9)}$$

where $v_1^i$ is the variance of the log of MTM value of the property based on first transaction, and so on for the second and later transactions.

From Eq. 7, the variance of a MTM prediction $\hat{P}_{T,1}^i$ depends upon (1) the sampling variance of the valuation bias parameter $b_{ijk}$, which can be empirically estimated; (2) the sampling variance of the Branch HPI parameters $\hat{I}_T$ and $\hat{I}_t$; and (3) the variance of the disturbance term of Eq. 1, which is assumed to be a quadratic function of T−t.

Although the example involving the HPI introduced by the other aspect of the present invention is described, it is noted that the artisan is free to use any available HPI to accommodate this aspect of the present invention.

Figure 9:
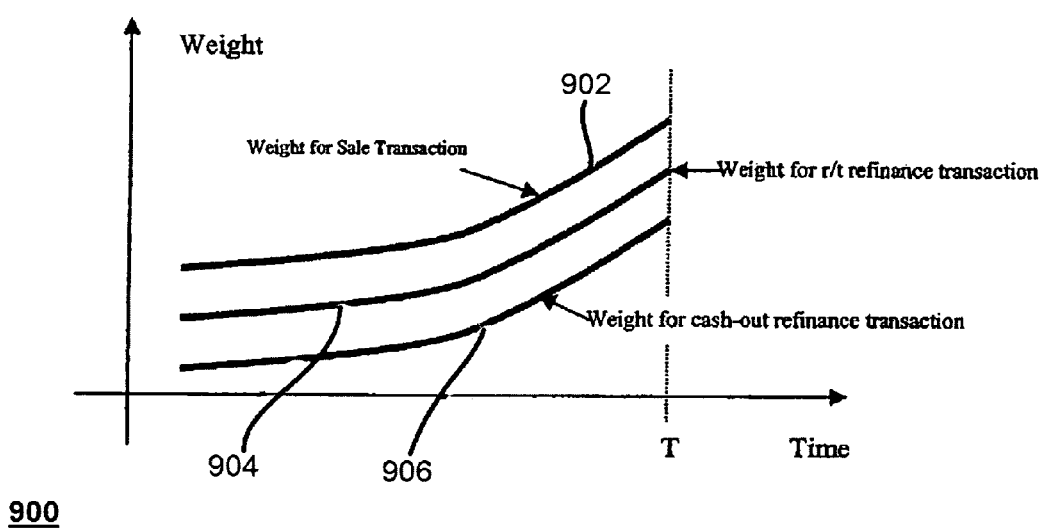
FIG. 9 is a graphical diagram schematically illustrating an example of weighting in multiple transaction based property valuation.

FIG. 9 is a graphical diagram 900 that conceptually illustrates an example of weighting in multiple transaction based property valuation, and the results provided by Eq. 9. The impact of transaction type and recency upon weighting are particularly evident from the graph.

In this example, the transaction types are (1) purchase transaction, (2) rate/term refinance, and (3) cash out refinance. Plots of the weights corresponding to purchase 902, rate/term refinance 904, and cash out refinance 906 transactions are depicted. This graph depicts how the time period and type of transaction factor in the relevancy of the data, which in turn is implemented by the depicted weighting.

As described, typical systems rely on the one transaction to predict property value, which is sub-optimal. For one, the most recent transaction might be a non-purchase transaction. Just prior to that, there might be a purchase transaction. Those who are skilled in the art of property value prediction might argue that one should use the purchase transaction instead, unless the purchase transaction was years before the non-purchase transaction. The valuation method of this aspect of the present invention systematically resolves this arbitrariness by using multiple prior transactions. Also, as described in the equations, the MTM value prediction is conditional on the prior transaction value $P_t$. Even when $P_t$ is a purchase transaction without systematic bias, $P_s$ embodies idiosyncratic error. Predicting property value using only one prior transaction retains the idiosyncratic error. MTV valuation method averages out the idiosyncratic errors embedded in multiple prior transactions, making the prediction more robust.

Figure 10:
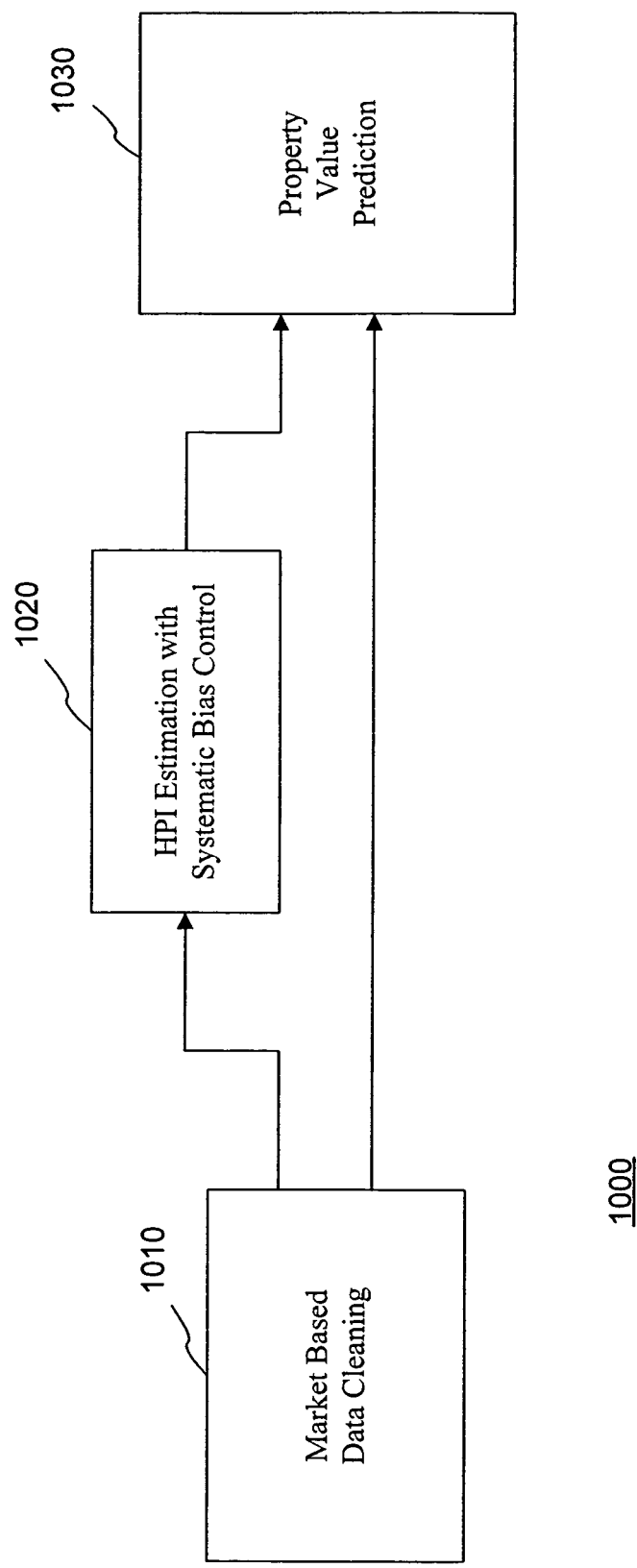
FIG. 10 is a schematic diagram illustrating a system that includes data cleaning, HPI estimation with systematic bias control, and property value prediction that uses multiple prior transactions.

FIG. 10 is a schematic diagram illustrating a system 1000 that includes an MBDC module 1010, an HPI Estimation with Systematic Bias Control module 1020, and a Property Value Prediction (e.g., mark-to-market) module 1030. The system 1000 usefully inter-relates the previously described MBDC, TBRTI and MTV aspects of the present invention, which may each be practiced independently or in combinatorial systems involving two or more such as the illustrated system 1000.

Preferably the MBDC module 1010 implements data cleaning to mitigate idiosyncratic errors. As described, this may involve the removal of redundant records followed by the removal of inconsistent records, or outliers. The former is accommodated by ensuring that the retained record is the most consistent with other transactions of the same property, the local market trend, and neighborhood market. Additionally, algorithms accommodate the adoption of a value as a representative single record for a transaction where multiple records are present for a transaction. Following duplicate removal, the MBDC module 1010 further eliminates erroneous records by eliminating transaction outliers. This is preferably also based upon the local market trend, along with all of the remaining transactions for each given property.

The cleaned data may be used in support of Property Value Prediction 1030 that, preferably, implements multiple transaction values such as MTV value prediction described above. Instead of choosing only one prior transaction, MTV uses multiple transactions to provide a more accurate mark-to-market value by applying a weighted combination of all transactions for a given property. The weighting factors recency and transaction type to correct for both sources of potential inaccuracy. The data cleaning helps ensure the removal of erroneous individual records and the retention of a single representative record for any given transaction, which furthers the accuracy of the MTV value prediction.

The cleaned data may also be used in conjunction with HPI Estimation with Systematic Bias Control 1020. An example of such HPI estimation is the previously described TB-RTI. TB-RTI particularly controls both aggregation bias and transaction type bias. It initially uses trusted transaction records for HPI estimation for large areas where transaction data are deemed sufficient to support viable HPI estimation. It then removes the bias from individual records, particularly but not necessarily limited to questioned transaction records. Finally, it then uses all available data for HPI estimation for smaller areas (e.g., zip codes, neighborhoods, etc.) once the biases in the data are corrected. The HPI provided by HPI Estimation with Systematic Bias Control 1020 may be used as the HPI in the Property Value Prediction module 1030.

The above may be an iterative process. Specifically, the HPI Estimation with Systematic Bias Control 1020 makes further adjustments to transaction records following the adjustments that were made pursuant to Data Cleaning 1010. These further adjustments may be made available for Data Cleaning 1010 in a following cycle. For example, a first month's set of data may be subjected to Data Cleaning 1010, with the cleaned data then being used for both HPI Estimation 1020 and Property Value Predication 1030. In a following month, the Data Cleaning 1010 may receive additional data that became available in the intervening period of time, and may also invoke the adjustments made within the HPI Estimation 1020 process from the first month.

Thus embodiments of the present invention provide market based data cleaning for removal of idiosyncratic error from transaction data used in property valuation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A computer implemented method for real property valuation, the method comprising:
   accessing, by a computer, transaction data comprising a plurality of records with corresponding values;
   identifying, by the computer, records that correspond to a given property from the plurality of records;
   determining, by the computer, records common to and associated with a first transaction for the given property from the identified records that fall within a given time window to produce a set of common records;
   determining, by the computer, a representative record for the first transaction based upon the values respectively provided by individual ones of the set of common records by performing a comparison between the values respectively provided by the set of common records and a value that is determined based upon a local market home price index; and
   using, by the computer, the representative record in lieu of the set of common records for the given time window.

2. The method of claim 1, wherein determining the representative record comprises:
   determining, by the computer, the representative record to be the record with a value that is closest to a mean value provided by the set of common records when the set of common records includes more than two records and the differences between the respective values provided by the set of common records are below a predetermined amount.

3. The method of claim 1, wherein determining the representative record comprises:
determining, by the computer, the representative record to be the record with a value that is closest to the average of one or more mark-to-market values determined from the local market home price index using one or more transactions outside the given time window for the given property.

4. The method of claim 1, wherein determining the representative record comprises:
determining, by the computer, the representative record based upon proximity of records to an average mark-to-market value of a property for the local market determined from the local market home price index, where it is determined that there are no mark-to-market values corresponding to transactions outside the given time window for the given property.

5. The method of claim 1, wherein the given time window is one of a set of time windows for which representative records are determined, whereby determining, by the computer, representative records for each of the time windows removes redundant records from the transaction data corresponding to each of the set of time windows for the given property.

6. The method of claim 5, further comprising:
removing, by the computer, inconsistent representative records from the transaction data corresponding to the given property after removal of redundant records, wherein removing the inconsistent representative records is based upon a comparison of the difference between the value of a given representative record from a value that is expected based upon the local market home price index using representative records other than the given representative record.

7. The method of claim 6, further comprising:
calculating, by the computer, a price estimation index by applying a repeat transaction model to records remaining in the transaction data after removal of redundant and inconsistent records.

8. The method of claim 6, further comprising:
determining, by the computer, a predicted value for the given property as a mark-to-market value determined from a price estimation index using multiple representative records that remain for the given property after removal of redundant and inconsistent records.

9. A system for real property value estimation, the system comprising:
a device comprising a memory that stores a property value estimation application, wherein the application includes:
a property transactions data module, which provides access to transaction data comprising a plurality of records with corresponding values;
a records grouping module, in communication with the property transactions data module, which identifies records that correspond to a given property from the plurality of records and determines records common to and associated with a first transaction for the given property from the identified records that fall within a given time window to produce a set of common records; and
a records removal module, in communication with the records grouping module, which determines a representative record for the first transaction based upon the values respectively provided by individual ones of the set of common records by performing a comparison between the values respectively provided by the set of common records and a value that is determined based upon a local market home price index, and uses the representative record in lieu of the set of common records for the given time window.

10. The system of claim 9, wherein the records removal module determines the representative record to be the record that is closest to a mean value provided by the set of common records when the set of common records includes more than two records and the differences in the values provided by the set of common records are small.

11. The system of claim 9, wherein the records removal module determines the representative record to be the record with a value that is closest to the average of one or more mark-to-market values determined from the local market home price index using one or more transactions outside the given time window for the given property.

12. The system of claim 9, wherein the records removal module determines the representative record based upon proximity of records to an average mark-to-market value of a property for the local market determined from the local market home price index, where it is determined that there are no mark-to-market values corresponding to transactions outside the given time window for the given property.

13. The system of claim 9, wherein the given time window is one of a set of time windows for which representative records are determined, whereby determining representative records for each of the time windows removes redundant records from the transaction data corresponding to each of the set of time windows for the given property.

14. The system of claim 13, wherein the records removal module removes inconsistent representative records from the transaction data corresponding to the given property after removal of redundant records, wherein removing the inconsistent representative records is based upon a comparison of the difference between the value of a given representative record from a value that is expected based upon the local market home price index using representative records other than the given representative record.

15. The system of claim 14, further comprising:
an RTI module, which calculates a price estimation index by applying a repeat transaction model to records remaining in the transaction data after removal of redundant and inconsistent records.

16. The system of claim 14, further comprising:
a property valuation module, which determines a predicted value for the given property as a mark-to-market value determined from a price estimation index using multiple representative records that remain for the given property after removal of redundant and inconsistent records.

17. The method of claim 1, further comprising:
determining, by the computer, a respective representative record for each transaction in addition to the first transaction, each transaction in addition to the first transaction having associated records from which the respective representative record is determined, each respective representative record determined based upon the values respectively provided by individual ones of the associated records by performing a comparison between the values respectively provided by the associated records and a value that is determined based upon a local market home price index;
eliminating a transaction with a mark-to-market value furthest from a local market average of the local market home price index when the given property has two transactions and when mark-to-market values of the two transactions are different.

18. The method of claim 1, wherein determining the representative record comprises:
   determining the representative record based on a predetermined data provider reliability hierarchy when the set of common records only includes two records and when differences between the respective values provided by the two records are below a predetermined amount.

19. The method of claim 18, wherein determining the representative record comprises:
   determining the representative record to be the record with a value that is closest to a mean value provided by the set of common records when the set of common records includes more than two records and when the differences between the respective values provided by the set of common records are below the predetermined amount; and
   determining the representative record to be the record with a value that is closest to the average of one or more mark-to-market values determined from the local market home price index using one or more transactions outside the given time window for the given property when the set of common records includes more than two records and when the differences between the respective values provided by the set of common records are above the predetermined amount.

20. The method of claim 1, wherein the given time window is forty-five days.

* * * * *